United States Patent [19]

Ziegler

[11] Patent Number: 4,520,675
[45] Date of Patent: Jun. 4, 1985

[54] PRESSURE OR PRESSURE DIFFERENCE MEASURING TRANSDUCER

[75] Inventor: Horst Ziegler, Berlin, Fed. Rep. of Germany

[73] Assignee: Siemens Aktiengesellschaft, Berlin and Munich, Fed. Rep. of Germany

[21] Appl. No.: 480,742

[22] Filed: Mar. 31, 1983

[30] Foreign Application Priority Data

Apr. 6, 1982 [DE] Fed. Rep. of Germany ....... 3213320

[51] Int. Cl.³ .............................................. G01L 9/12
[52] U.S. Cl. ...................................... 73/718; 73/706; 73/708; 361/283
[58] Field of Search ................. 73/718, 706, 724, 708, 73/431; 361/283

[56] References Cited

U.S. PATENT DOCUMENTS 3,195,028 7/1965 Werner et al. ........................ 73/718
4,370,890 2/1983 Frick ..................................... 73/718
4,389,895 6/1983 Rud, Jr. ................................. 73/718

OTHER PUBLICATIONS

Siemens publication, "Teleperm Measuring Transducer K", Order No. E 682/1022.

Primary Examiner—Donald O. Woodiel
Attorney, Agent, or Firm—Kenyon & Kenyon

[57] ABSTRACT

In a pressure or pressure difference measuring transducer comprising a diaphragm clamping housing which is held in a pressure housing by means of a ring shaped support element, and separating diaphragms which rest against suitably shaped formed beds of the pressure housing in the event of an overload, in order to obtain a comparatively compact design which can be produced at comparatively low cost, the support element is designed and connected to the pressure housing and the diaphragm clamping housing so that a connection of the pressure and the diaphragm clamping housing which is stiff in a direction parallel to the housing is produced.

6 Claims, 2 Drawing Figures

PRESSURE OR PRESSURE DIFFERENCE MEASURING TRANSDUCER

BACKGROUND OF THE INVENTION

This invention relates to pressure or pressure difference measuring transducers in general and more particularly to a transducer which is more compact and less sensitive to changes in the environment.

A pressure or pressure difference transducer which includes a diaphragm clamping housing, in which a measuring diaphragm is clamped between two fixed capacitor plates; a pressure housing, in which the diaphragm clamping housing is held by means of a ring shaped support element which is elastic in the radial direction; and separating diaphragms which, in the event of an overload, rest against surfaces correspondingly shaped as formed beds is described in Siemens Publication "TELEPERM Measuring Transducer K", Order No. E 682/1023. In this transducer, the support element consists of a ring shaped diaphragm which is, on the one hand, tightly connected to the diaphragm clamping housing at its outer circumference and is clamped, on the other hand, in the pressure housing. In this manner, the diaphragm clamping housing is suspended floatingly in the pressure housing. This suspension has the advantage that the spring stiffness of the measuring diaphragm is not influenced by the static pressure of the measuring medium.

Therefore, measuring errors due to changes of the static pressure do not occur in this known measuring transducer. The floating suspension of the diaphragm clamping housing, in the known measuring transducer, results in the further advantage that, in the event of an overload, excessive strain cannot occur in the measuring diaphragm since the elastic support element is connected parallel to the measuring diaphragm; this support element substantially takes up the volume of liquid which is pressed out under the separating diaphragm concerned when the measuring transducer is heavily overloaded on one side. Null errors due to excessive stretching of the measuring diaphragm are therefore avoided in the known measuring transducer.

It is an object of the present invention to provide a pressure or pressure difference transducer which, while retaining the advantages of the known measuring transducer, is distinguished by a comparatively compact design and can be produced considerably lower cost.

SUMMARY OF THE INVENTION

To solve this problem, according to the present invention, the support element in a pressure or pressure difference measuring transducer of the type described at the outset is designed and connected to the pressure and the diaphragm clamping housing, in such a manner that a connection between the pressure and the diaphragm clamping housing, which is stiff in the direction parallel to the axis, is produced.

It is an essential advantage of the measuring transducer according to the present invention that the diaphragm clamping housing, in spite of its floating suspension, executes no movements in the axial direction, due to the great stiffness of the support element in the direction parallel to the axis, so the large gaps on both sides of the diaphragm clamping housing which are required in the known measuring transducer can be eliminated. In the measuring transducer according to the present invention, the volume of liquid within the pressure housing is therefore considerably smaller than in the known measuring transducer. In the measuring transducer according to the present invention, the amounts of liquid under the separating diaphragms need not completely reach the maximum absorption volume of the measuring diaphragm even at the maximum operating temperature and the lowest static pressure; the filling volumes are chosen large enough that the separating diaphragms do not touch the formed beds for full excursion at the lowest operating temperature and maximum pressure. The measuring diaphragm is therefore not overstretched even in the event of an overload. In the measuring transducer according to the present invention, not only are detrimental influences on the measuring diaphragm in the event of an overload prevented, but it is also assured that, due to the elasticity of the support element in the radial direction, elongations of the pressure housing in the case of changes of the static pressure have no influence on the measuring diaphragm and on the measuring characteristics. A further advantage of the measuring transducer according to the present invention is its comparatively compact design. This is due mainly to the fact that the measuring transducer according to the present invention has comparatively small liquid spaces. Accordingly, the separating diaphragms can be made relatively small, which contributes substantially to the small design dimensions of the measuring transducer according to the present invention.

In the measuring transducer according to the present invention, the support element can be designed in different ways; for instance, it may consist of two concentrically arranged thin-walled tubular parts which are connected on one of their sides to each other and on their respective other sides to the pressure housing on the one hand and, on the other hand, to the diaphragm clamping housing. It is considered as particularly advantageous if the support element is a thin walled tube which is firmly connected at its one end to the pressure housing and at its other end firmly connected to the diaphragm clamping housing. One advantage of using such a support element is that it provides great stiffness in the direction parallel to the axis. A further advantage is seen in that it takes up only a small amount of space in the radial direction, whereby the use of such a support element contributes in a particular manner to obtaining a measuring transducer with an especially compact physical dimensions and a small filling volume. In one embodiment of the measuring transducer according to the present invention, utilizing a thin walled tube as the support element, the pressure housing advantageously is made of a central body corresponding to the length of the thin walled tube and of two cap-like lateral parts for accepting two pressure-proof feedthroughs for connecting leads of the capacitor plates, for forming the shaped beds and for fastening the separating diaphragms. In a pressure housing so designed, the thin walled tube can be connected in a particularly simple manner to it as well as also to the diaphragm clamping housing, the width of which advantageously corresponds to that of the pressure housing.

So that, on the one hand, lateral parts of the pressure housing which are relatively easy to manufacture can be used and to obtain, on the other hand, liquid filling spaces as small as possible, in the measuring transducer according to the present invention, filling bodies with a very small coefficient of thermal expansion are advantageously located in the interior spaces between the diaphragm clamping housing and the lateral parts. These may consist, for instance, of ceramic or Invar alloys. These filling bodies, in interaction with the pressure housing which has greater thermal expansion, have the purpose of taking up changes of the liquid filling volume which result from temperature changes.

DETAILED DESCRIPTION

Figure 1:
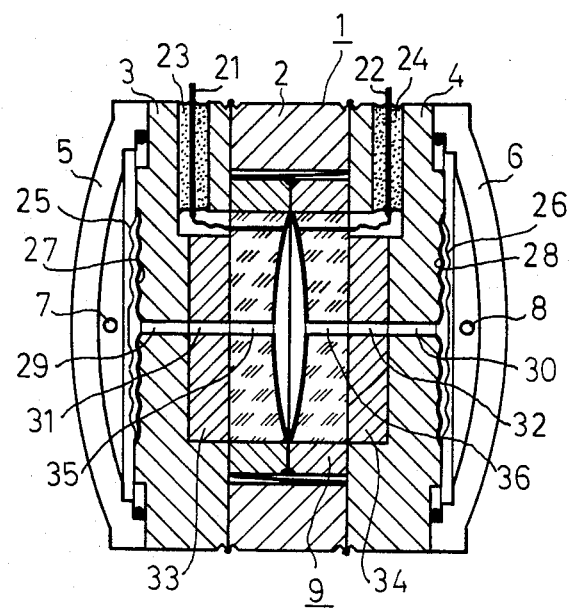
FIG. 1 is a cross-sectional view of an embodiment of the pressure or pressure difference measuring transducer according to the present invention.

The pressure or pressure difference measuring transducer according to FIG. 1 includes a pressure housing 1 which has a central body 2 and cap-like lateral parts 3 and 4. Both lateral parts 3 and 4 are closed off by means of housing caps 5 and 6 which are provided with openings 7 and 8. The pressure difference to be measured is admitted to the measuring transducer through the openings 7 and 8.

Figure 2:
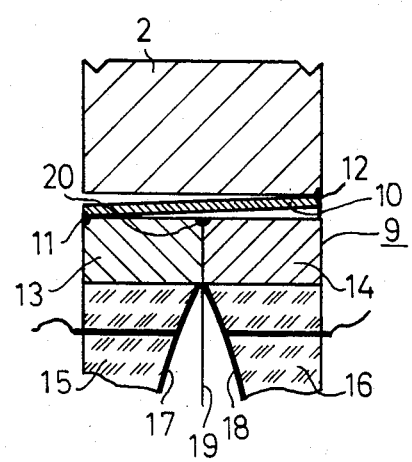
FIG. 2 is an enlarged detail of the embodiment according to FIG. 1.

Within the pressure housing 1, a diaphragm clamping housing 9 is held by fastening it to the central body 2 with a thin walled tube 10 (see also FIG. 2) For this purpose, the thin walled tube 10 has its one end 11 fastened to the diaphragm clamping housing 9 and its other end 12 tightly fastened to the central body 2 of the pressure housing 1, in the present case by welding. The diaphragm clamping housing 9 contains two outer ring parts 13 and 14 of metal as well as two insulating parts 15 and 16 which support fixed capacitor plates 17 and 18. A measuring diaphragm 19 is clamped between the outer ring parts 13 and 14; the measuring diaphragm 19 is welded to the ring parts 13 and 14 at the point 20.

Leads 21 and 22 are brought, through pressure proof feedthroughs 23 and 24, into the pressure housing 1 from the outside to the fixed capacitor plates 17 and 18. In this manner, the change of the capacity between the measuring diaphragm 19 and the respective fixed capacitor plates 17 and 18 can be determined and be used in an evaluating device, not shown,, for obtaining an electrical variable which is proportional to the prevailing pressure difference.

The cap-like lateral parts 3 and 4 are each provided with a separating diaphragm 25 and 26, opposite which are lateral surfaces, shaped as formed bed 27 and 28, of the cap-like lateral part 3 and 4. Each cap-like lateral part 3 and 4 is, in addition, provided with a through-hole, holes 29 and 30, respectively. These through-holes 29 and 30 are lined up with further through-holes 31 and 32 in filling bodies 33 and 34 which are arranged between the diaphragm clamping housing 9 and the cap-like lateral parts 3 and 4. Filling bodies 33 and 34 are made of a material with a very small coefficient of thermal expansion. The liquid which fills the spacer on both sides of diaphragm 19 and fills holes 35 and 36, holes 31 and 32, holes 29 and 30, and the space behind diaphragms 25 and 26 transmits the pressure difference from diaphragms 25 and 26 to the measuring diaphragm 19 which is deflected in the one or the other direction accordingly, depending on the pressure difference.

In the measuring transducer according to the present invention, a change of the static pressure within the pressure housing 1 is kept away form the diaphragm clamping housing 9, since the expansion of the pressure housing 1 accompanying the change of the static pressure in the radial direction is taken up by the support element, e.g., the thin walled tube 10. The measuring diaphragm 19 therefore remains uninfluenced by changes of the static pressure, so that no measuring error occurs. In the event of an overload, either the separating diaphragm 25 or the separating diaphragm 26 comes to rest against the shaped bed 27 or 28, whereby the filling liuqid under it is pressed out. However, no overstretching of the measuring diaphragm 19 results since the liquid volume pressed out under the respective separating diaphragm is taken up by the measuring diaphragm 19. Overstretching the measuring diaphragm 19 is thereby avoided, so that null errrors due to an overload cannot also occur.

What is claimed is:

1. In a pressure or pressure difference measuring transducer comprising:
    a diaphragm clamping housing;
    two fixed capacitor plates in said housing;
    a measuring diaphragm clamped between the two fixed capacitor plates;
    a pressure housing;
    a ring shaped support element which is elastic in the radial direction supporting the clamping housing in the pressure housing; and
    first and second separating diaphragms mounted to the pressure housing such that they rest against suitably formed shaped beds in the pressure housing in the event of an overload, the improvement comprising:
    the ring shaped support element being designed and connected to the pressure housing and the diaphragm clamping housing in such a manner that a connection between the pressure housing and the diaphragm clamping housing which is stiff in a direction parallel to the axis is produced.

2. The improvement according to claim 1, wherein said support element comprises a thin walled tube having its one end firmly connected to the diaphragm clamping housing and its other end firmly connected to the pressure housing.

3. In a pressure or pressure difference measuring transducer comprising:
    a diaphragm clamping housing;
    two fixed capacitor plates in said housing;
    a measuring diaphragm clamped between the two fixed capacitor plates;
    a pressure housing;
    a ring shaped support element which is elastic in the radial direction supporting the clamping housing in the pressure housing; and
    first and second separating diaphragms mounted to the pressure housing such that they rest against suitably formed shaped beds in the pressure housing in the event of an overload, the improvement comprising:
    the ring shaped support element being designed and connected to the pressure housing and the diaphragm clamping housing in such a manner that a connection between the pressure housing and the diaphragm clamping housing which is stiff in a direction parallel to the axis is produced, said support element comprising a thin walled tube having its one end firmly connected to the diaphragm clamping housing and its other end firmly connected to the pressure housing, said pressure housing comprising a central body having a length corresponding to the length of said thin walled tube and two cap-like lateral parts for: accepting pressure proof feedthroughs for connecting leads of the capacitor plates; forming the shaped beds; and fastening the separating diaphragms.

4. The improvement according to claim 3 and further including, in the interior spaces between the diaphragm clamping housing, and the lateral parts of the pressure housing, filling bodies with a thermal expansion coefficient which is small as compared to the pressure housing.

5. In a pressure or pressure difference measuring transducer comprising:

a diaphragm clamping housing;

two fixed capacitor plates in said housing;

a measuring diaphragm clamped between the two fixed capacitor plates;

a pressure housing;

a ring shaped support element which is elastic in the radial direction supporting the clamping housing in the pressure housing; and first and second separating diaphragms mounted to the pressure housing such that they rest against suitably formed shaped beds in the pressure housing in the event of an overload, the improvement wherein:

said support element comprises a thin walled tube having a first end, a second end opposite thereto, an inner surface and an outer surface, said thin walled tube being connected at said first end and said inner surface to said diaphragm clamping housing, said thin walled tube being connected at said second end and said outer surface to said pressure housing.

6. The improvement according to claim 5 wherein said pressure housing comprises a central body having a length corresponding to the length of said thin walled tube and two cap-like lateral parts, said thin walled tube being connected to said central body.

* * * * *